United States Patent
Hassan et al.

(10) Patent No.: US 10,929,949 B2
(45) Date of Patent: Feb. 23, 2021

(54) ACCESSING A MEMORY CONFIGURED TO STORE AN IMAGE DATA CUBE

(71) Applicant: Infineon Technologies AG, Neubiberg (DE)

(72) Inventors: Muhammad Hassan, Munich (DE); Pedro Costa, Munich (DE); Andre Roger, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 15 days.

(21) Appl. No.: 16/367,635

(22) Filed: Mar. 28, 2019

(65) Prior Publication Data

US 2020/0311863 A1 Oct. 1, 2020

(51) Int. Cl.
*G06T 1/60* (2006.01)
*G06F 12/02* (2006.01)
*G06T 3/40* (2006.01)

(52) U.S. Cl.
CPC ............ *G06T 1/60* (2013.01); *G06F 12/0207* (2013.01); *G06T 3/40* (2013.01); *G06F 2212/6026* (2013.01)

(58) Field of Classification Search
CPC ......... G06T 1/60; G06T 3/40; G06F 12/0207; G06F 2212/6026
See application file for complete search history.

(56) References Cited

U.S. PATENT DOCUMENTS

| | | | |
|---|---|---|---|
| 2007/0294470 A1* | 12/2007 | Van Dyke | G06F 13/161 711/104 |
| 2010/0138587 A1* | 6/2010 | Hutson | G06F 12/0607 711/5 |
| 2013/0013879 A1* | 1/2013 | Yamada | G06F 13/1668 711/167 |
| 2014/0032812 A1* | 1/2014 | Ong | G11C 13/0002 711/102 |
| 2018/0019023 A1* | 1/2018 | Han | G11C 29/006 |
| 2018/0231636 A1* | 8/2018 | Maher | G01S 13/64 |
| 2019/0138934 A1* | 5/2019 | Prakash | G06K 9/6257 |

* cited by examiner

*Primary Examiner* — Maurice L. McDowell, Jr.
*Assistant Examiner* — Donna J. Ricks
(74) *Attorney, Agent, or Firm* — Schiff Hardin LLP (57) ABSTRACT

A device for accessing memory configured to store an image data cube, wherein the memory has memory banks, and each memory bank has memory rows and memory columns. The device includes an input configured to receive a memory access request having a logical start address, which specifies a logical bank, a logical row, and a logical column, and a burst size; and a memory address generator configured to generate physical memory addresses based on the logical start address and the burst size, wherein any consecutive logical start addresses mapped to different memory rows are mapped to different memory banks.

18 Claims, 8 Drawing Sheets

200A
Radar Data Cube
with Bank Assigning

Figure 2B

200B
Radar Data Cube
in Memory
with Bank Assigning

Figure 2C

200C
Radar Data Cube
in Memories 10 and 20
with Bank Assigning

Figure 2D

200D
Radar Data Cube
in Memory
with Bank Assigning

Figure 3A

300A
Radar Data Cube
with Accessing a
Vector along Doppler

Figure 3B

300B
Radar Data Cube
in Memory
with Accessing a
Vector along Doppler

Figure 4A

400A
Radar Data Cube
with Accessing a
Vector along Range

Figure 4B

400B
Radar Data Cube
in Memory
with Accessing a
Vector along Range

Figure 5A

500A
Radar Data Cube
with Accessing a
Vector along Virtual Channel

Figure 5B

500B
Radar Data Cube
in Memory
with Accessing a
Vector along Virtual Channel

Figure 6A

600A
Radar Data Cube
with Accessing a Matrix
in Range-Doppler Plane

Matrix access in
Range Doppler Map

Figure 6B

600B
Radar Data Cube
in Memory
with Accessing a Matrix
in Range-Doppler Plane

US 10,929,949 B2

ACCESSING A MEMORY CONFIGURED TO STORE AN IMAGE DATA CUBE

BACKGROUND

Radar signal processing involves analyzing image data to identify object position, velocity, angle, and type. The image data is stored in a form of a radar data cube. The dimensions of the radar data cube are range, Doppler, and virtual channel.

Radar data cube dimensions are increasing due to radar front end design evolutions and radar application precisions (e.g., self-driving cars). Radar data cubes no longer fit within internal (on-chip) memory, which may be Static Random Access Memory (SRAM). Designers are therefore considering storing radar data cubes in external memory.

Dynamic Random Access Memory (DRAM) may be used as external memory when internal memory is not sufficient. However, radar data cubes need to be stored in the external memory in such a way that there is maximum image data throughput while maintaining conventional radar signal processing performance.

DETAILED DESCRIPTION

The present disclosure is directed to a device having a memory address generator configured to generate physical memory addresses based on a logical start address and a burst size, wherein any consecutive logical start addresses mapped to different memory rows of a memory are mapped to different memory banks. By not closing and opening a row in a same bank in consecutive memory accesses, the benefits of external memory may be realized while maintaining conventional performance.

Figure 1:
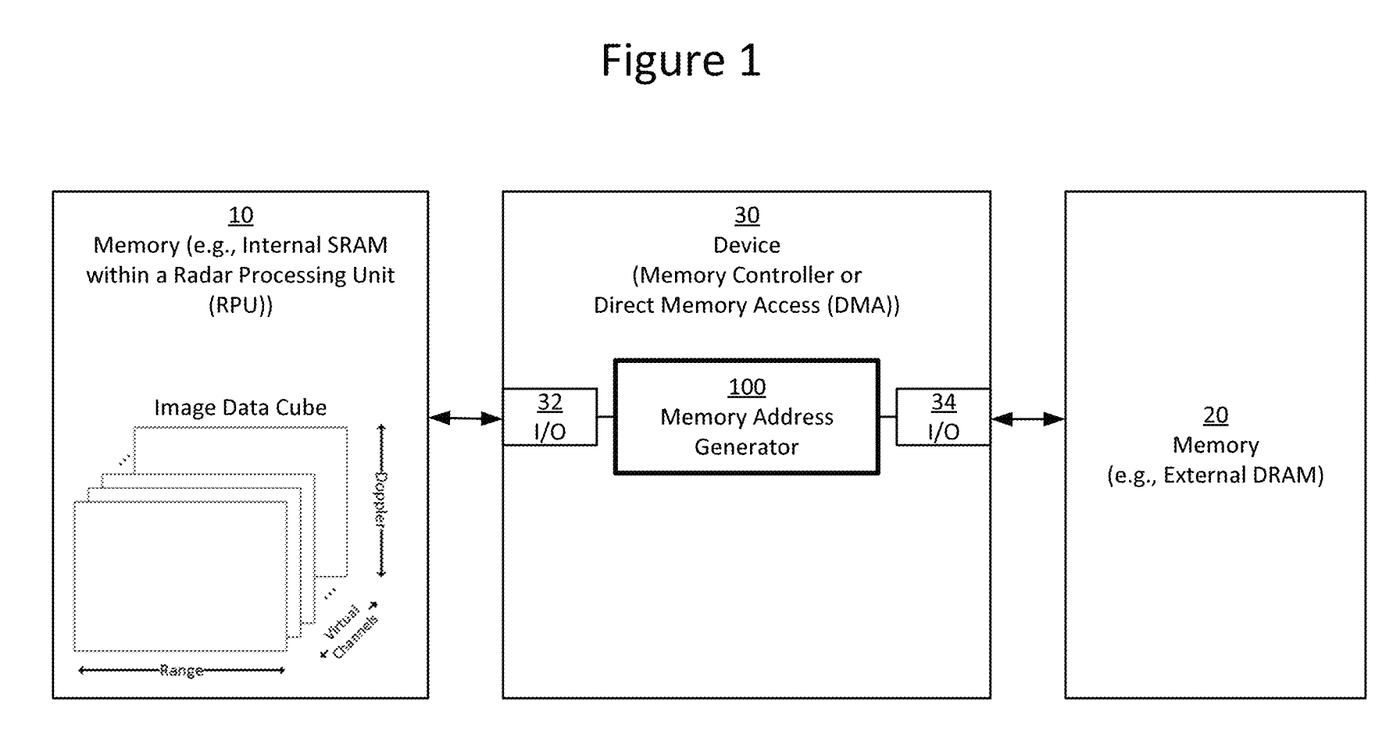
FIG. 1 is a schematic diagram of a device for accessing memory configured to store an image data cube in accordance with aspects of the disclosure.

FIG. 1 is a schematic diagram of a device 30 for accessing memory configured to store an image data cube in accordance with aspects of the disclosure. The device 30 manages data transfers between memory 10 and memory 20.

The memory 10 may be, for example, internal (on-chip) Static Random Access Memory (SRAM). The SRAM memory 10 is configured to store an image data cube, which has rows, banks, and columns. The image data cube may be a radar data cube in which the rows store Doppler data, the banks store virtual channel data, and the columns store range data. While the memory 10 is described as being an internal SRAM memory, the disclosure is not limited to the memory 10 being internal or SRAM. The memory 10 may be internal or external, and may be any type of memory as applicable.

The memory 20 may be, for example, an external Dynamic Random Access Memory (DRAM). The DRAM memory 20, like the SRAM memory 10, is configured to store an image data cube, which may be a radar data cube. The DRAM memory 20 of this disclosure stores the radar data cube in a different format than the SRAM memory 10. While the memory 20 is described as being an external DRAM memory, the disclosure is not limited to the memory 20 being external or DRAM. The memory 20 may be internal or external, and may be any type of memory as applicable.

The device 30 may be, for example, a memory controller (e.g., a DRAM controller) or a Direct Memory Access (DMA) controller. The device 30 is configured to manage data transfer into and out of the DRAM memory 20. The device 30 translates memory access requests received from a processor (e.g., Radar Processing Unit) to memory command sequences. The device 30 accesses the DRAM memory 20 from a starting address through an ending address dependent on a burst size, as indicated in the command sequence.

The DRAM memory access pattern and organization is defined by Joint Electron Device Engineering Council (JEDEC). Before explaining details of the memory address generator 100 of this disclosure, what follows is background explanation of DRAM generally.

DRAM may comprise a plurality of memory banks. According to JEDEC, Double Data Rate Type 3 (DDR3) DRAM comprises eight memory banks, and Double Data Rate fourth generation (DDR4) DRAM comprises eight or sixteen memory banks. The memory banks permit serving multiple requests simultaneously. Each memory bank has memory cells arranged in a matrix of memory rows and memory columns. Each memory cell has a capacitor and a transistor for saving a data bit. The capacitor is either charged or uncharged, representing a binary value. The transistor is used to access the stored value.

Due to the arrangement of DRAM, reading one memory cell is equivalent to reading the entire memory row of this memory cell. A memory controller opens the requested memory row by pulling the corresponding address line to a high level. A sense amplifier senses the signals on the memory column address lines. If the capacitor was charged, the memory column address line is high. Otherwise, the line stays low. The reading result is then stored in a latch. After reading the line, the capacitors are discharged, and the memory controller refreshes the memory row, meaning all data stored in the latch is written back to the memory cells. Consecutive reads from a same memory row can be served immediately from the latch.

Similarly, writing to a memory cell is equivalent to writing the complete memory row. The line is first opened and sensed by the sense amplifier. The sense amplifiers of the memory columns to be written are forced to the corresponding high or low values. This updates the capacitors' charge in the active row and therefore stores the value.

A memory row buffer in each bank stores a currently active (open) memory row. A memory row buffer is located between the memory cells and a memory bus and is present in each memory bank. Due to the matrix design of DRAM, every time a value is read, an entire memory row has to be fetched. For this, the memory row is opened and copied to the memory row buffer. If data is read from an open memory row, the data can be read immediately. Otherwise, if a different memory row needs to be accessed, the currently open memory row is closed. This means that if there is modified data in the memory row buffer, the modified data has to be written back to the memory cells first. Then, the new memory row is opened and fetched. The process of closing the current memory row and re-opening a different memory row is called a memory row conflict. A memory row conflict takes significantly more time than a non memory row conflict, as the current memory row needs to be written back before a new memory row can be fetched. It takes approximately 20 ns to access data from a currently open memory row, whereas it takes approximately 60 ns if there is a memory row conflict.

Referring back to FIG. 1, the device 30 comprises Input/Output (I/O) 32, I/O 34, and a memory address generator 100. The I/O 32 is configured to transceive data, commands, and memory addresses with the SRAM memory 10. The I/O 34 is configured to transceive data, commands, and memory addresses with the DRAM memory 20.

The memory address generator 100, which is a focus of this disclosure and is described in more detail below, is configured to generate (transpose) memory addresses between the SRAM memory 10 and the DRAM memory 20. The memory address generator 100 is optimized to write a three-dimensional radar data cube from the SRAM memory 10 to the DRAM memory 20, to read two-dimensional vectors of the radar data cube stored in the DRAM memory 20, and to read a complete three-dimensional radar data cube from the DRAM memory 20.

By way of overview of the device 100's operation, the I/O 32 is configured to receive from a processor (e.g., Radar Processing Unit not shown) a memory access request to access the DRAM memory 20. The memory access request has a logical start address, which specifies a logical bank, a logical row, and a logical column, and also has a burst size. The memory address generator 100 is then configured to generate physical memory addresses of the DRAM memory 20 based on the logical start address and the burst size. The I/O 34 is configured to transmit, in a command sequence to the DRAM memory 20, the generated physical memory addresses.

FIGS. 2A-2D are schematic diagrams of a radar data cube 200 with memory bank assigning.

Figure 2A:
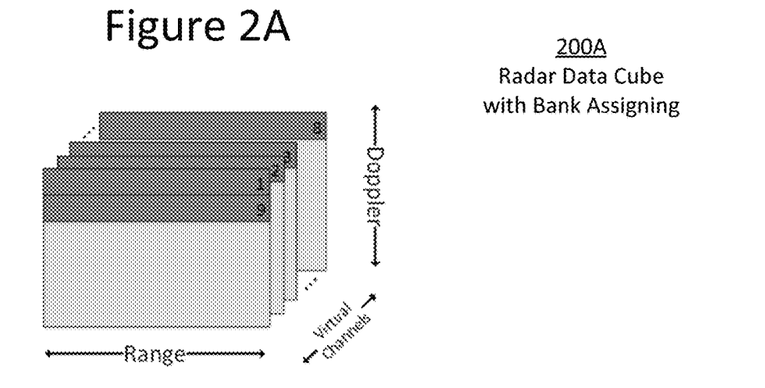
FIGS. 2A-2D are schematic diagrams of a radar data cube with memory bank assigning.

As mentioned above in discussing DRAM generally, JEDEC defines the number of memory banks, the size of each memory row, and access characteristics for each access request (read or write). Examples of these DRAM access characteristics include if a memory row is already open, access to this memory row is fast. Also, multiple memory banks may simultaneously have a respective memory row open, as shown in FIG. 2A; accessing open memory rows from different memory banks is also fast. However, if a memory row is closed and in a consecutive access request another memory row in the same bank is opened, this access takes significantly longer.

The DRAM memory bank assignment disclosed herein results in fast accesses of the DRAM memory 20. When advancing in a direction (vector) of the image data cube, the advance is not in the direction of the memory row alone because this would take significantly longer. In other words, in consecutive accesses of the DRAM memory 20, two different memory rows are not accessed from a same memory bank. This is because an open memory row does not need to be closed and then another memory row opened before the second of the consecutive memory accesses is carried out.

Figure 2B:
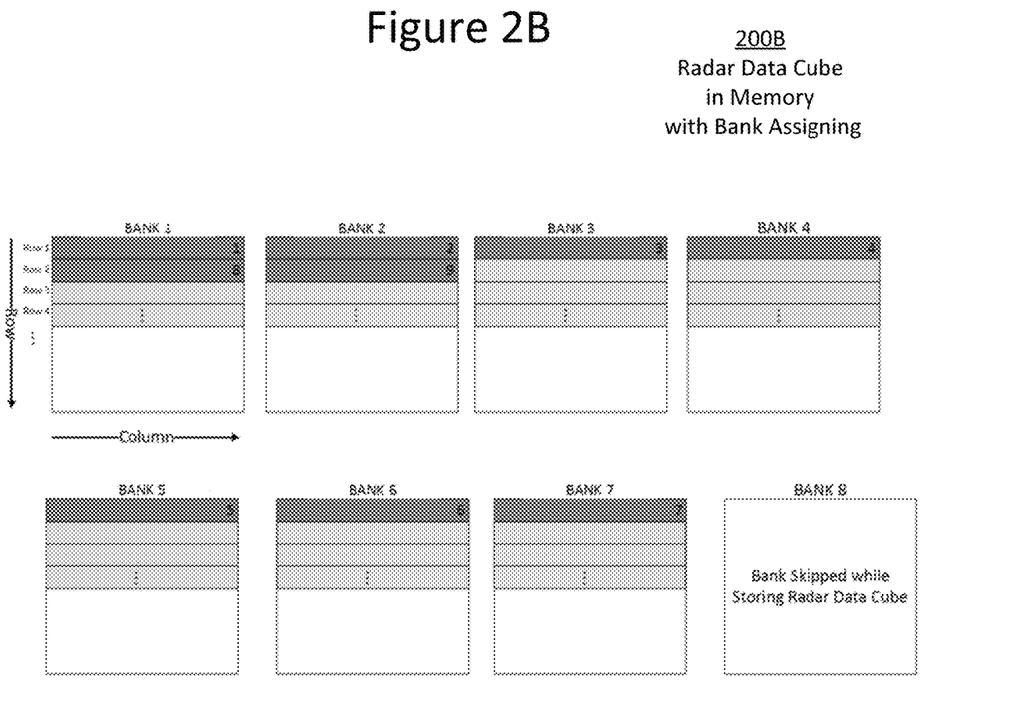
Figure 2C:
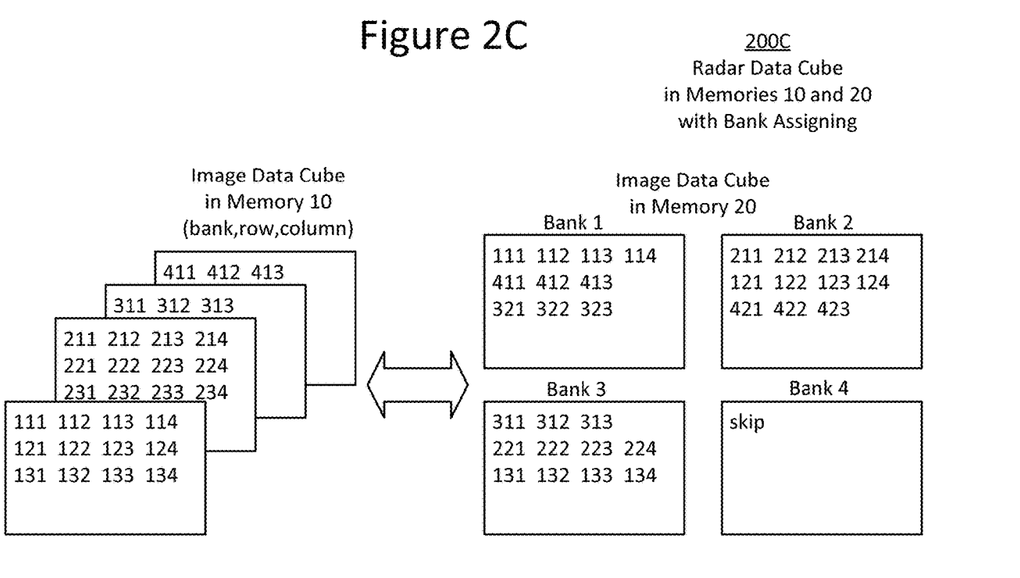

FIGS. 2B and 2C show memory bank assigning examples in which a memory bank is skipped.

Not all of the memory banks of the DRAM memory 20 are necessarily used for storing the radar data cube. In most applications, the number of memory banks of the DRAM memory 20 is eight or four. Rather than use all four or eight memory banks, the radar data cube may be stored in all but one of the memory banks, that is, an odd number of memory banks, such as seven (see FIG. 2B) or three (see FIG. 2C). The memory address generator 100 may be configured to skip generating physical memory addresses of a memory bank such that this skipped memory bank does not store any of the image data.

FIG. 2B shows an example in which Bank 8 is skipped. The image data cube is written vector by vector. Vector 1 is written to Row 1 in Bank 1, Vector 2 is written to Row 1 in Bank 2, and so on. Vector 8 is written to Row 2 in Bank 1 instead of following normal order of writing to Row 1 in Bank 8. The pattern repeats with Bank 8 being skipped. For reading the image data cube from the DRAM memory 20, the same order is followed.

FIG. 2C shows an example in which Bank 4 is skipped. Again, the image data cube is written vector by vector. Vector 1 (111 112 113 114) is written to Row 1 in Bank 1, Vector 2 (211 212 213 214) is written to Row 1 in Bank 2, and so on. Vector 4 (411 412 413) is written to Row 2 in Bank 1 instead of following normal order of writing to Row 1 in Bank 4. The pattern repeats with Bank 4 being skipped. For reading the image data cube from the DRAM memory 20, the same order is followed.

Figure 2D:
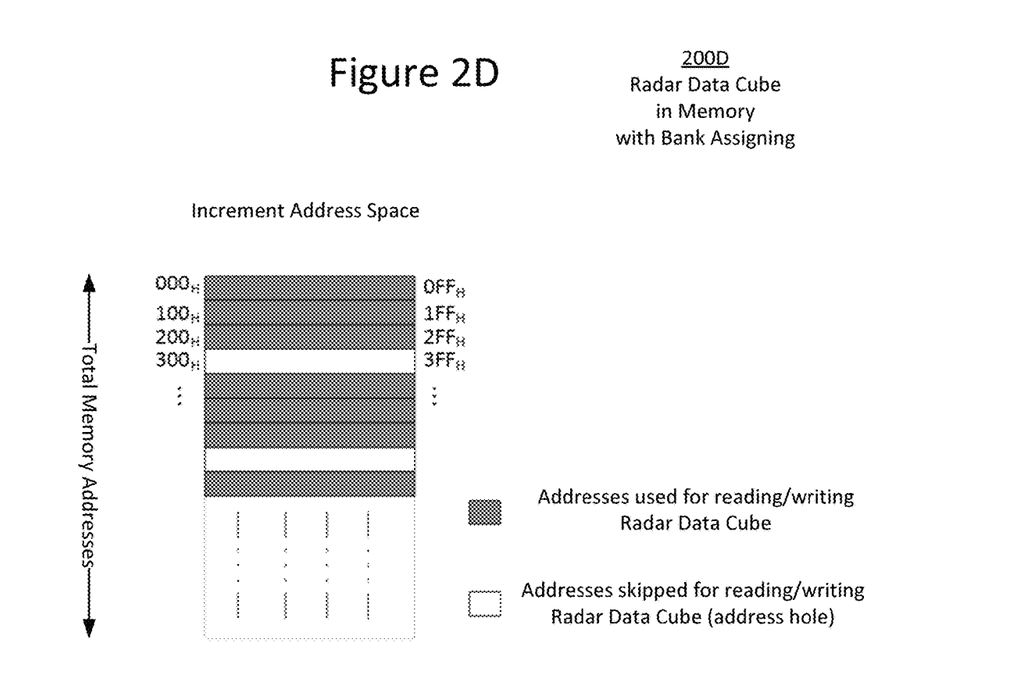

As shown in FIG. 2D, the reading/writing the image data cube with bank skipping can also be seen as a linear address space leaving an intentional address hole. Also, the memory address generator 100 may be configured to skip generating physical memory addresses of a portion of a memory bank. Thus such address holes may comprise complete memory banks, or additionally or alternatively, portions of memory banks.

The bank/address skipping permits the DRAM memory 20 to be a shared resource. The portions of the DRAM memory 20 that do not store image data may be used by other applications without influence by image data cube accesses. Usually the image data cube is smaller than the DRAM memory 20 anyway.

Also, it is appreciated that the device 30 may schedule an access request in an optimized way by. For example, the device 30 may read a second and a third data portion before a first portion because another high priority application is accessing a memory bank storing a first portion.

Figure 3A:
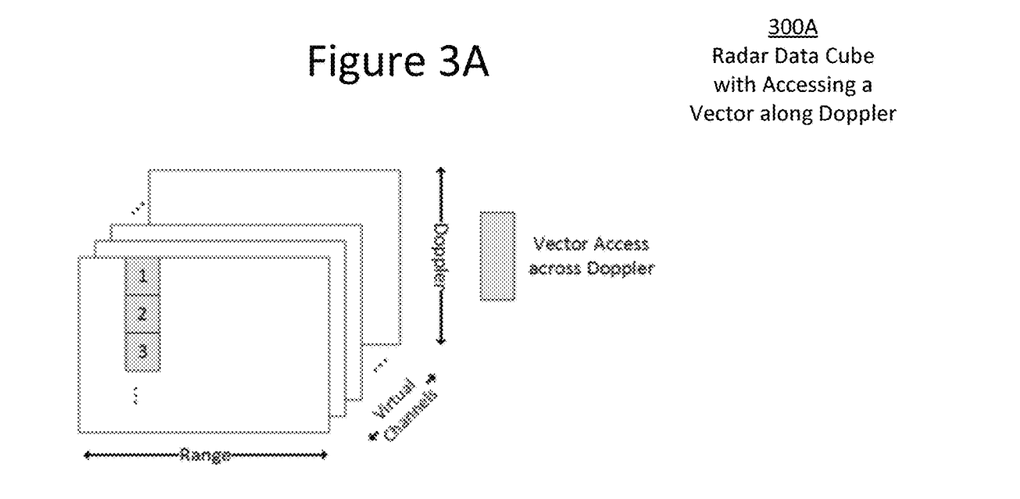
FIGS. 3A-3B are schematic diagrams of a radar data cube with accessing a vector in a Doppler dimension.
Figure 3B:
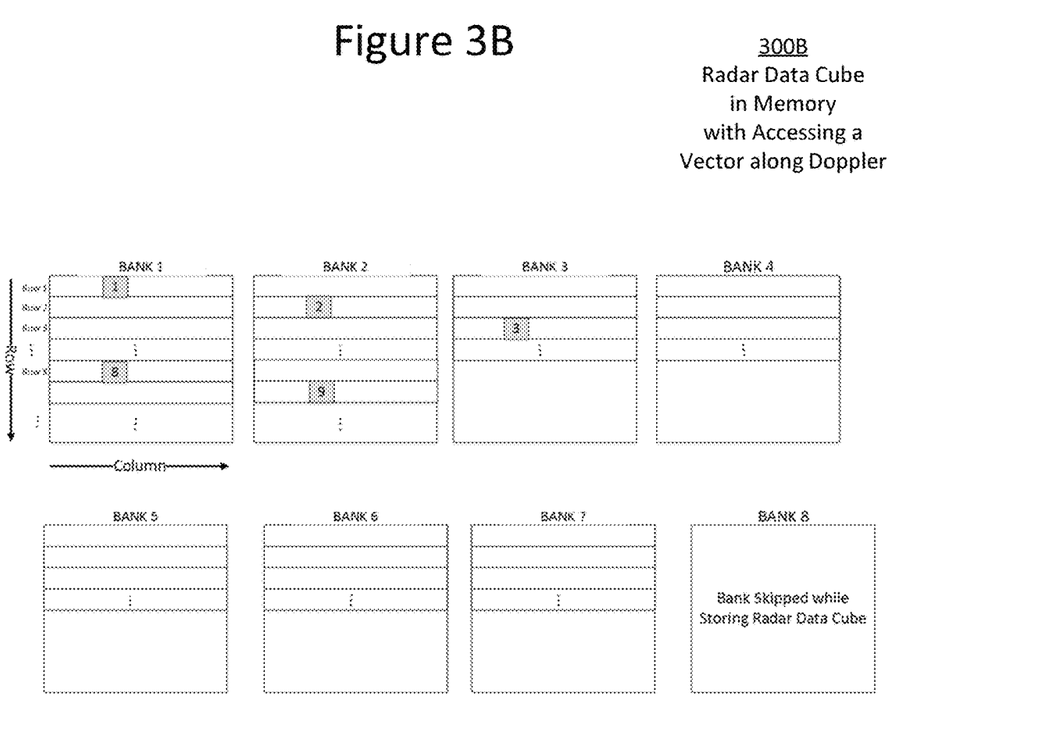
Figure 4A:
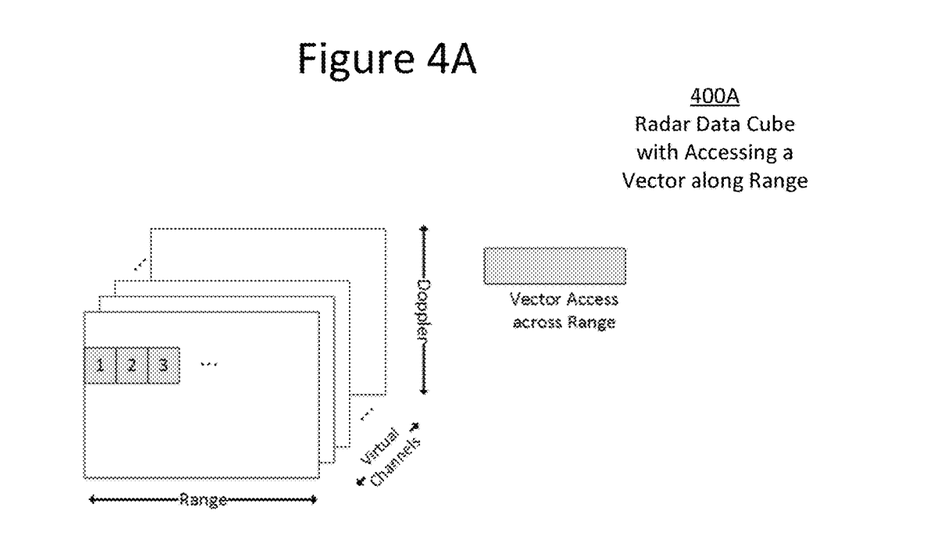
FIGS. 4A-4B are schematic diagrams of a radar data cube with accessing a vector in a range dimension.
Figure 4B:
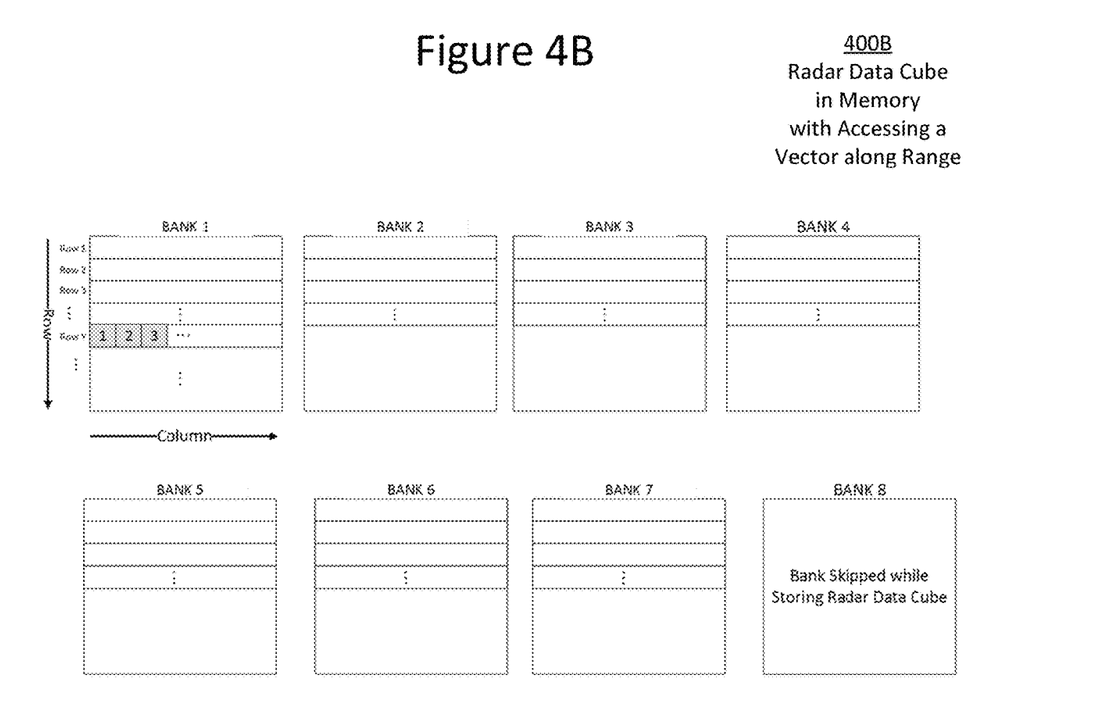
Figure 5A:
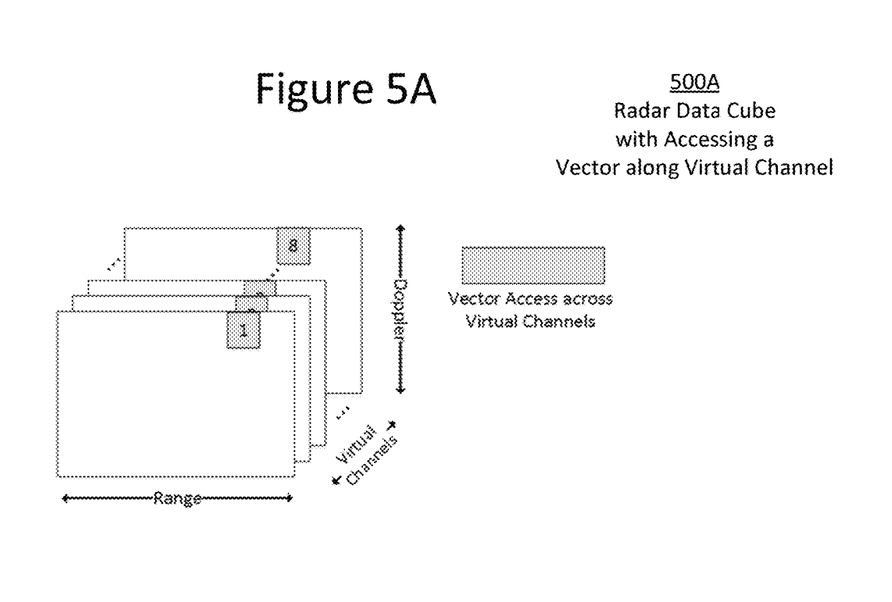
FIGS. 5A-5B are schematic diagrams of a radar data cube with accessing a vector in a virtual channel dimension.
Figure 5B:
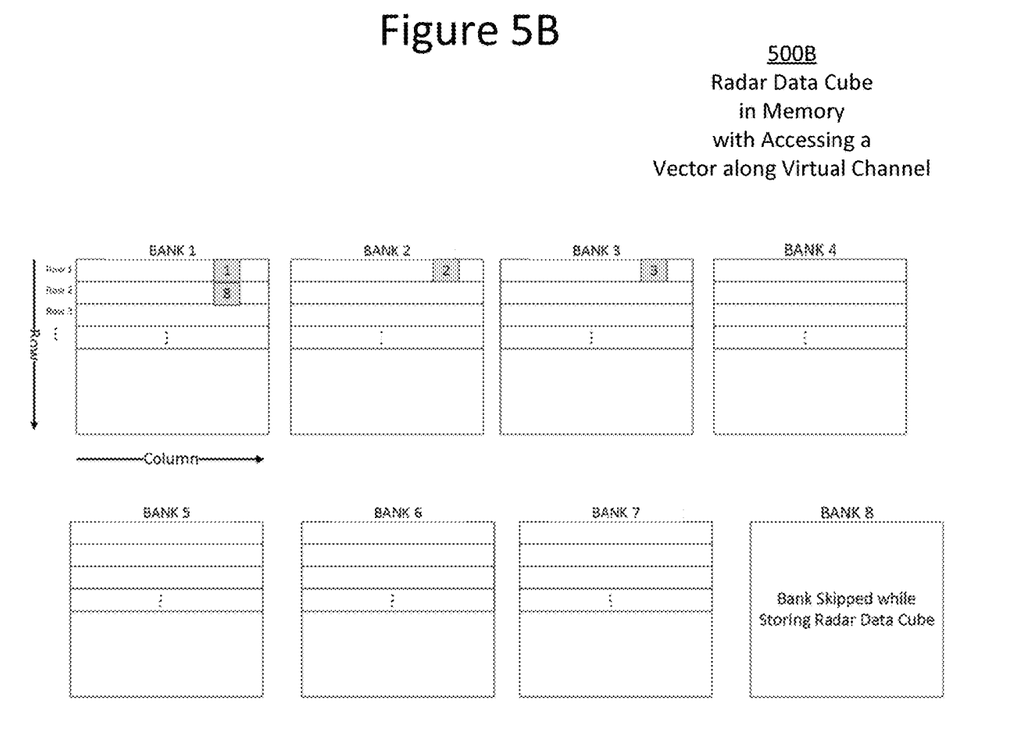
Figure 6A:
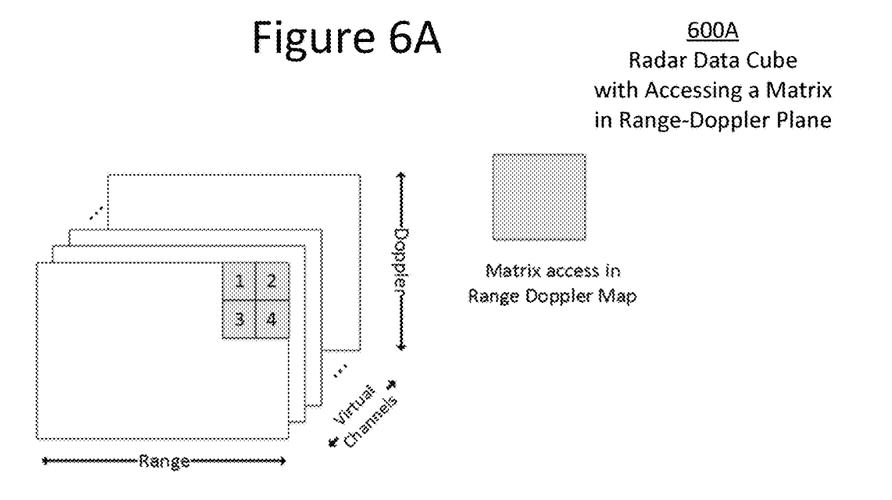
FIGS. 6A-6B are schematic diagrams of a radar data cube with accessing a matrix in a range-Doppler plane.
Figure 6B:
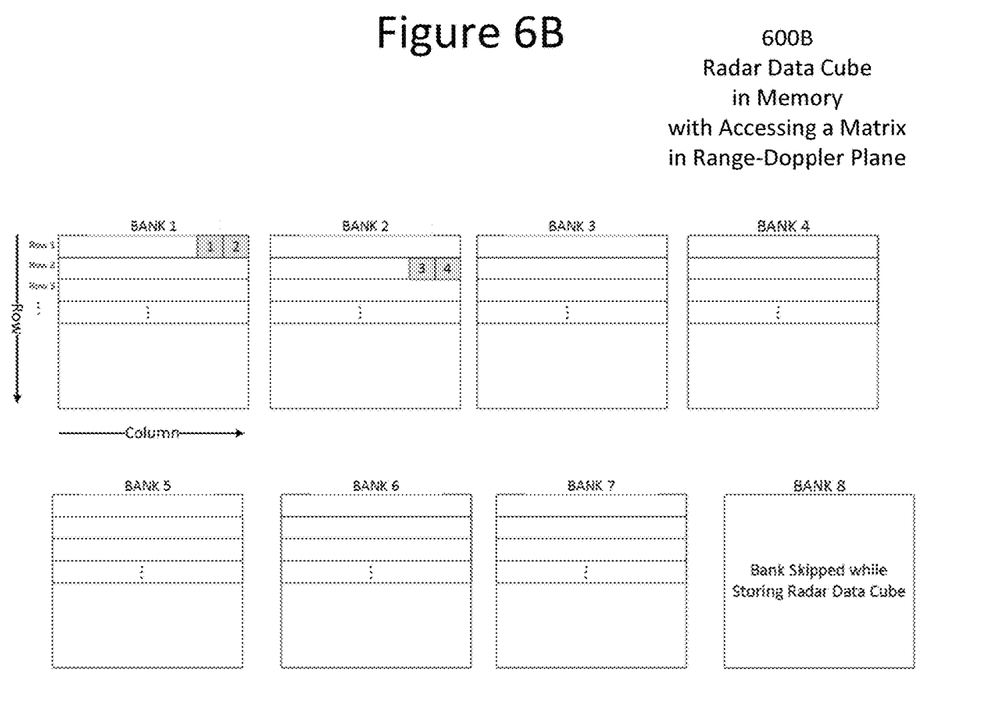

FIGS. 3A-3B, 4A-4B, 5A-5B, and 6A-6B illustrate examples of accessing the DRAM memory 20. FIGS. 3A-3B illustrate accessing a vector in a Doppler dimension. FIG. 4A-4B illustrate accessing a vector along a range dimension. FIGS. 5A-5B illustrate accessing a vector virtual channel dimension. FIGS. 6A-6B illustrate accessing a matrix in a range-Doppler plane. In each of these examples, any consecutive logical start addresses mapped to different memory rows are mapped to different memory banks.

FIGS. 3A-3B are schematic diagrams of a radar data cube 300 with accessing a vector in a Doppler (row) dimension.

The device 30 is configured to keep a memory row open in each of a plurality of memory banks simultaneously. Using the same example of writing the image data cube with bank assigning as described above with respect to FIGS. 2A-2D, reading a vector in a Doppler (row) dimension includes opening one row (e.g., Row 1 in Bank 1, Row 2 in Bank 2, etc.) in each of the seven Banks 1-7. A vector in a Doppler dimension is read in sequence from the different Banks 1-7, that is, reading data block 1 from Row 1 of Bank 1, reading data block 2 from Row 2 of Bank 2, reading data block 3 from Row 3 of Bank 3, and so on.

Also, the device 30 may be configured to, while a memory row of a memory bank of the memory banks is open, close a memory row and open another memory row of another of the memory banks. For example, while reading from Banks 4-7, it is possible in Bank 1 to close Row 1 and open a new Row X. After data block 7 in Bank 7 is read, data block 8 is read from Row X in Bank 1 (Bank 8 skipped), and so on. For writing, the same order is followed.

FIGS. 4A-4B are schematic diagrams of a radar data cube 400 with accessing a vector in a range (column) dimension.

The memory address generator 100 may be further configured to generate physical memory addresses for consecutive logical start addresses mapped to different memory columns, the same memory row, and the same memory bank.

Using the same example of writing the image data cube with bank assigning as described above with respect to FIGS. 2A-2D, reading a vector in a range dimension includes opening Row Y in Bank 1, reading in sequence from the opened Row Y all of the data blocks (e.g., data block 1, data block 2, data block 3 . . . ) of the vector. For writing, the same order is followed.

FIGS. 5A-5B are schematic diagrams of a radar data cube 500 with accessing a vector in a virtual channel (bank) dimension.

The memory address generator 100 may be further configured to generate physical memory addresses for consecutive logical start addresses mapped to the same memory column, the same memory row, and different memory banks.

Using the same example of writing the image data cube with bank assigning as described above with respect to FIGS. 2A-2D, reading a vector in a virtual channel dimension includes opening one row in each of the seven Banks 1-7 (e.g., Row 1 in Bank 1, Row 1 in Bank 2, etc.), reading in sequence from the memory banks, and after data block 7 (memory bank overflow), data block 8 is read from Row 2 in Bank 1, and so on. For writing, the same order is followed.

Again, the device 30 may be configured to, while a memory row of a memory bank of the memory banks is open, close a memory row and open another memory row of another of the memory banks. For example, while reading from Banks 4-7, it is possible to close Row 1 if Bank 1 and open Row 2 in Bank 1.

FIGS. 6A-6B are schematic diagrams of a radar data cube 600 with accessing a matrix in a range-Doppler (column, row) plane.

The memory address generator 100 may be further configured to generate physical memory addresses for consecutive logical start addresses mapped to different memory columns, different memory rows, and different memory banks.

Using the same example of writing the image data cube with bank assigning as described above with respect to FIGS. 2A-2D, reading a matrix in a range-Doppler plane. The reading includes opening one row (e.g., Row 1 in Bank 1, Row 2 in Bank 2, etc.) in each of seven Banks 1-7, and reading in sequence from the banks by row and column, such as reading data block 1 from Row 1 in Column Z in Bank 1, then reading data block 2 from Row 1 in Column Z+1 in Bank 1, then reading data block 3 from Row 2 in Column Z in Bank 2, then reading data block 4 from Row 2 in Column Z+1 in Bank 2, and so on. For writing, the same order is followed.

Figure 7:
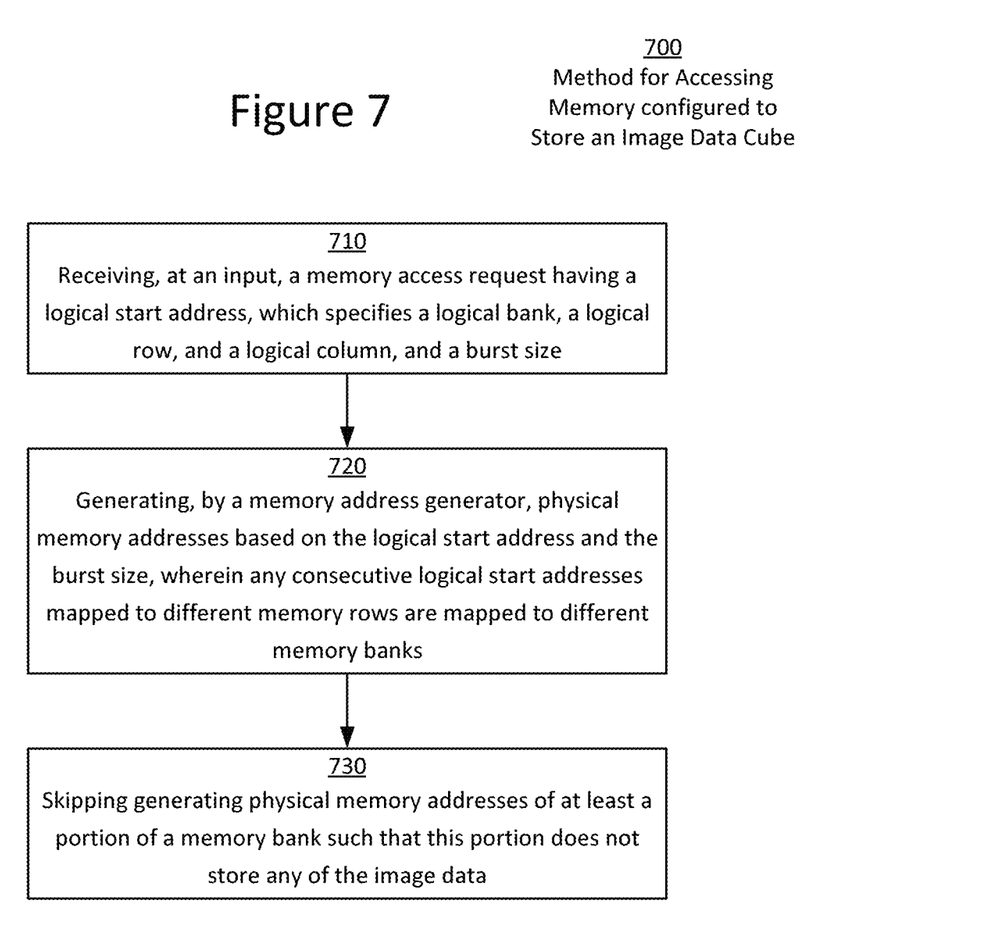
FIG. 7 is a flowchart of a method for accessing memory configured to store an image data cube.

FIG. 7 is a flowchart of a method 700 for accessing DRAM memory 20 configured to store an image data cube. As discussed above, the DRAM memory 20 is configured to store an image data cube. The memory has memory banks, and each memory bank has memory rows and memory columns.

At Step 710, the device 20 receives, at its input 32, a memory access request having a logical start address, which specifies a logical bank, a logical row, and a logical column, and a burst size.

At Step 720, the memory address generator 100 generates physical memory addresses based on the logical start address and the burst size. Any consecutive logical start addresses mapped to different memory rows are mapped to different memory banks.

At Step 730, the memory address generator 100 skips generating physical memory addresses of at least a portion of a memory bank such that this portion does not store any of the image data.

The techniques of this disclosure may also be described in the following examples.

Example 1

A device for accessing memory configured to store an image data cube, wherein the memory has memory banks, and each memory bank has memory rows and memory columns, the device comprising: an input configured to receive a memory access request having a logical start address, which specifies a logical bank, a logical row, and a logical column, and a burst size; and a memory address generator configured to generate physical memory addresses based on the logical start address and the burst size, wherein any consecutive logical start addresses mapped to different memory rows are mapped to different memory banks.

Example 2

The device of example 1, wherein the memory address generator is further configured to generate physical memory addresses for consecutive logical start addresses mapped to different memory columns, the same memory row, and the same memory bank.

Example 3

The device of any combination of examples 1 and 2, wherein the memory address generator is further configured to generate physical memory addresses for consecutive logical start addresses mapped to the same memory column, the same memory row, and different memory banks.

Example 4

The device of any combination of examples 1-3, wherein the memory address generator is further configured to generate physical memory addresses for consecutive logical start addresses mapped to different memory rows at a memory bank overflow.

Example 5

The device of any combination of examples 1-4, wherein the memory address generator is further configured to generate physical memory addresses for consecutive logical start addresses mapped to different memory columns, different memory rows, and different memory banks.

Example 6

The device of any combination of examples 1-5, wherein the image data cube is a radar image data cube, and the memory rows, memory banks, and memory columns are configured to store Doppler data, virtual channel data, and range data, respectively.

Example 7

The device of any combination of examples 1-6, wherein the memory address generator is further configured to access an odd number of memory banks.

Example 8

The device of any combination of examples 1-7, wherein the memory address generator is further configured to skip generating physical memory addresses of a portion of a memory bank such that this portion does not store any of the image data.

Example 9

The device of any combination of examples 1-8, wherein the memory address generator is further configured to skip generating physical memory addresses of a memory bank such that this skipped memory bank does not store any of the image data.

Example 10

The device of any combination of examples 1-9, wherein the device is configured to keep a memory row open in each of a plurality of memory banks simultaneously.

Example 11

The device of any combination of examples 1-10, wherein the device is configured to, while a memory row of a memory bank of the memory banks is open, close a memory row and open another memory row of another of the memory banks.

Example 12

The device of any combination of examples 1-11, wherein the memory is a Dynamic Random Access Memory (DRAM).

Example 13

The device of any combination of examples 1-12, wherein the DRAM is Joint Electron Device Engineering Council (JEDEC) compliant.

Example 14

The device of any combination of examples 1-13, wherein the device is a Dynamic Random Access Memory (DRAM) controller or a Direct Memory Access (DMA) controller.

Example 15

A method for accessing memory configured to store an image data cube, wherein the memory has memory banks, and each memory bank has memory rows and memory columns, the method comprising: receiving, at an input, a memory access request having a logical start address, which specifies a logical bank, a logical row, and a logical column, and a burst size; and generating, by a memory address generator, physical memory addresses based on the logical start address and the burst size, wherein any consecutive logical start addresses mapped to different memory rows are mapped to different memory banks.

Example 16

The method of example 15, wherein the generating physical memory addresses is for: consecutive logical start addresses mapped to different memory columns, the same memory row, and the same memory bank, consecutive logical start addresses mapped to the same memory column, the same memory row, and different memory banks, consecutive logical start addresses mapped to different memory rows at a memory bank overflow, or consecutive logical start addresses mapped to different memory columns, different memory rows, and different memory banks.

Example 17

The method of any combination of examples 15 and 16, further comprising: skipping generating physical memory addresses of at least a portion of a memory bank such that this portion does not store any of the image data.

Example 18

The method of any combination of examples 15-17, further comprising: skipping generating physical memory addresses of a memory bank such that this skipped memory bank does not store any of the image data.

Example 19

The device of any combination of examples 15-18, keeping a memory row open in each of a plurality of memory banks simultaneously.

Example 20

The method of any combination of examples 15-19, further comprising: while a memory row of a memory bank of the memory banks is open, close a memory row and open another memory row of another of the memory banks.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A device for accessing memory configured to store an image data cube, wherein the memory has memory banks, and each memory bank has memory rows and memory columns, the device comprising:
   an input configured to receive a memory access request having a logical start address, which specifies a logical bank, a logical row, and a logical column, and a burst size; and a memory address generator configured to generate physical memory addresses based on the logical start address and the burst size, and to generate the physical memory addresses for consecutive logical start addresses, mapped to different memory columns, the same memory, row, and the same memory bank, wherein any consecutive logical start addresses mapped to different memory rows are mapped to different memory banks.

2. A device for accessing memory configured to store an image data cube, wherein the memory has memory banks, and each memory bank has memory rows and memory columns, the device comprising:
  an input configured to receive a memory access request having a logical start address, which specifies a logical bank, a logical row, and a logical column, and a burst size; and
  a memory address generator configured to generate physical memory addresses based on the logical start address and the burst size, and to generate physical memory addresses for consecutive logical start addresses, mapped to the same memory column, the same memory row, and different memory banks, wherein any consecutive logical start addresses mapped to different memory rows are mapped to different memory banks.

3. The device of claim 2, wherein the memory address generator is further configured to generate physical memory addresses for consecutive logical start addresses mapped to different memory rows at a memory bank overflow.

4. The device of claim 1, wherein the memory address generator is further configured to generate physical memory addresses for consecutive logical start addresses mapped to different memory columns, different memory rows, and different memory banks.

5. The device of claim 1, wherein the image data cube is a radar image data cube, and the memory rows, memory banks, and memory columns are configured to store Doppler data, virtual channel data, and range data, respectively.

6. The device of claim 1, wherein the memory address generator is further configured to access an odd number of memory banks.

7. The device of claim 1, wherein the memory address generator is further configured to skip generating physical memory addresses of a portion of a memory bank such that this portion does not store any of the image data.

8. The device of claim 7, wherein the memory address generator is further configured to skip generating physical memory addresses of a memory bank such that this skipped memory bank does not store any of the image data.

9. The device of claim 1, wherein the device is configured to keep a memory row open in each of a plurality of memory banks simultaneously.

10. The device of claim 9, wherein the device is configured to, while a memory row of a memory bank of the memory banks is open, close a memory row and open another memory row of another of the memory banks.

11. The device of claim 1, wherein the memory is a Dynamic Random Access Memory (DRAM).

12. The device of claim 11, wherein the DRAM is Joint Electron Device Engineering Council (JEDEC) compliant.

13. The device of claim 1, wherein the device is a Dynamic Random Access Memory (DRAM) controller or a Direct Memory Access (DMA) controller.

14. A method for accessing memory configured to store an image data cube, wherein the memory has memory banks, and each memory bank has memory rows and memory columns, the method comprising:
  receiving, at an input, a memory access request having a logical start address, which specifies a logical bank, a logical row, and a logical column, and a burst size; and
  generating, by a memory address generator, physical memory addresses based on the logical start address and the burst size, wherein the generating physical memory addresses is for:
    consecutive logical start addresses mapped to different memory columns, the same memory row, and the same memory bank,
    consecutive logical start addresses mapped to the same memory column, the same memory row, and different memory banks,
    consecutive logical start addresses mapped to different memory rows at a memory bank overflow, or
    consecutive logical start addresses mapped to different memory columns, different memory rows, and different memory banks,
  wherein any consecutive logical start addresses mapped to different memory rows are mapped to different memory banks.

15. The method of claim 14, further comprising:
  skipping generating physical memory addresses of at least a portion of a memory bank such that this portion does not store any of the image data.

16. The method of claim 14, further comprising:
  skipping generating physical memory addresses of a memory bank such that this skipped memory bank does not store any of the image data.

17. The device of claim 14, keeping a memory row open in each of a plurality of memory banks simultaneously.

18. The method of claim 17, further comprising:
  while a memory row of a memory bank of the memory banks is open, close a memory row and open another memory row of another of the memory banks.

* * * * *